United States Patent Office 3,541,050
Patented Nov. 17, 1970

3,541,050
PRODUCTION OF POLYESTERS DYEABLE WITH BASIC DYES FROM PHENOLSULFONATES
Tatundo Tanaka, Sunto-gun, Shizuoka-ken, Yutaka Yasuhara, Tuneo Harada, and Tatuo Nogi, Mishima-shi, and Osamu Iida, Tagata-gun, Shizuoka-ken, Japan, assignors to Toyo Rayon Kabushiki Kaisha, Tokyo, Japan, a corporation of Japan
No Drawing. Filed Oct. 28, 1968, Ser. No. 771,341
Int. Cl. C08g 17/14
U.S. Cl. 260—49                                     2 Claims

ABSTRACT OF THE DISCLOSURE

In producing modified polyesters containing a minor proportion of an organic group having a sulfonate substituent in the form of an alkali metal salt, the method which comprises adding at least one phenolsulfonate selected from the class consisting of the alkali metal salts of m-phenolsulfonic acid, 2-chlorophenol-4-sulfonic acid, 2-naphthol-8-sulfonic acid and resorcinol-5-sulfonic acid and the lithium salts of p-phenolsulfonic acid and hydroquinonesulfonic acid, to the reaction mixture prior to the completion of the synthesis of the polyester to be modified and thereafter completing the synthesis of the polyester.

---

This invention relates to improvements in the production of the sulfonate-containing polyesters which are dyeable with basic dyes.

It is known that the film and fiber-forming polyesters which contain a small proportion of an organic group having a sulfonate substituent in the form of an alkali metal salt have affinity for basic dyes (e.g. U.S. Pats. 3,018,272, 3,057,827 and 3,301,819). The methods which have been proposed heretofore for producing the modified polyesters of this kind had as their basis the use of a compound containing at least one ester-forming functional group together with at least one sulfonate group in the form of a metal salt as the modifying component, e.g. potassium p-hydroxyethoxybenzene sulfonate and sodium 3,5-dicarbomethoxybenzene sulfonate; and these methods comprised the addition of the modifying component either to the starting materials or to the reaction mixture during the ester-interchange or polycondensation reaction. However, in these prior art techniques there were frequently such shortcomings as that the manufacture of the modifying component from the compounds readily available commercially was relatively complicated; it was costly to purify the modifying component to a degree of high purity such as would provide polyesters of fiber grade; the resulting modified polyesters did not possess satisfactory resistances to the action of acids or alkalis; or the dyeings by means of basic dyes had poor colorfastness to sunlight. Hence there was a strong demand for improvements of these shortcomings.

It has been found that as the modifying component for introducing the sulfonate group into the polyester molecular chain a very limited group of phenolsulfonates were of great advantage when used in their as-obtained form, i.e. without first converting them into ester-forming derivatives.

Accordingly, the present invention provides a process for producing modified polyesters which is characterized in that in producing modified polyesters containing a minor proportion of an organic group having a sulfonate substituent in the form of an alkali metal salt, at least one phenolsulfonate selected from the class consisting of the alkali metal salts of m-phenolsulfonic acid, 2-chlorophenol-4-sulfonic acid, 2-naphthol-8-sulfonic acid and resorcinol-5-sulfonic acid and the lithium salts of p-phenolsulfonic acid and hydroquinone sulfonic acid is added to the reaction mixture prior to the completion of the synthesis of the polyester to be modified, and thereafter the synthesis of the polyester is completed.

Of the foregoing, phenolsulfonates, especially preferred are the sodium, potassium, rubidium and cesium salts of m-phenolsulfonic acid, the sodium and potassium salts of resorcinol-5-sulfonic acid, and the sodium and potassium salts of 2-naphthol-8-sulfonic acid. It was found that by using these phenolsulfonates as the modifying component not only was it possible to obtain modified polyesters having a better transparency than that of the conventional polyesters but also the so obtained modified polyesters would have a much pronounced affinity for basic dyes. Further, it was confirmed by submitting the resulting polymer to hydrolysis by means of an alkali and analysis of the hydrolytic product that the phenolsulfonate used was substantially quantitatively introduced into the polyester molecule by means of the ether linkage. For example, when the polyethylene terephthalate modified with sodium m-phenolsulfonate was hydrolyzed with an alkali, sodium m-($\beta$-hydroxyethoxy)benzene sulfonate was recovered in an amount corresponding to 98 mol percent of the sodium m-phenolsulfonate added to the reaction system.

It was truly surprising that the phenolsulfonates selected hereinbefore would become bonded substantially quantitatively in the polyester molecule by means of the ether linkage under the usual conditions of synthesizing polyesters. This is because it is known that under the usual conditions of synthesizing polyesters in the case of most of the phenolsulfonates which are very similar to the hereinbefore selected phenolsulfonates either desulfonation is set up, with the consequence that chemical bonding cannot take place in the polyester molecule and hence an exceedingly discolored polymer results, or even though bonding does take place in the polyester molecule, the proportion thereof is small and, in addition, since side reactions (e.g. desulfonation) are set up to a considerable extent, the resulting polymer is not of watery white color and its affinity for basic dyes is also unsatisfactory. For example, sodium resorcinol-4-sulfonate desulfonates under the polyester polymerization conditions and the polyester synthesized in its presence is not only discolored excessively but also has a low melting point and is non-crystalline, and hence it cannot possibly be of practical value. On the other hand, in the case of sodium 2-naphthol-6-sulfonate or sodium resorcinol-4,6-disulfonate, markedly turbid polyesters are obtained and the enhancement in the affinity for basic dyes is not so great. Again, when sodium p-phenolsulfonate is used, the resulting polyester is somewhat turbid, its melting point is slightly low and it has a considerable degree of affinity for basic dyes, but it is unsatisfactory as far as its practical utility is concerned. In this case, it was confirmed by analysis by subjecting the resulting polyester to hydrolysis that about 50% of the sodium p-phenolsulfonate used had formed ether linkage in the polymer and that a part of the remainder had been desulfonated during the polymerization reaction and had freed phenol.

The polyesters to be modified according to the present invention are most preferably those which are thermoplastic and are used for the production of synthetic fiber or the polyester film. Typical of these modified polyesters is polyalkylene terephthalate, and particularly polyethylene terephthalate. In addition, poly-p-ethyleneoxybenzoate derived from p-($\beta$-hydroxyethoxy)benzoic acid ester or polyesters derived from terephthalic acid (of its functional derivatives) and cyclohexane-1,4-dimethanol will do. In short, any which has an aliphatic alcoholic end group during the process of its synthesis will do. Further, the polyesters to be modified by the present invention need not necessarily be homopolyesters but can be, say, random or block copolymerized polyesters. Again, the applied techniques that are customarily employed in the processing of polyesters, for example, such as the technique of blending the polyesters with other synthetic polymers or the technique of composite spinning with polymers of differing degree of polymerization or composition can be conveniently applied to the polyesters modified by the present invention.

According to the invention the selected modifying component hereinbefore indicated is added to the reaction mixture prior to the completion of the synthesis of the polyester to be modified and thereafter the synthesis of the polyester is completed. In the case, say, the polyester is synthesized from a dibasic acid component and a dihydric alcohol component, the modifying component either may be added to the starting dibasic acid component and/or dihydric alcohol component or to the reaction mixture prior to or during the polycondensation reaction. The modifying component may be added as such or by using a suitable medium, if necessary. Since the reaction wherein the phenolic hydroxyl group in the modifying component forms the ether bond with the alcoholic end group of the polyester is seen to progress chiefly under the conditions of reduced pressure and elevated temperatures after the synthesis of the polyester has proceeded to a considerable extent, and also since the solubility of the modifying component under the polyester synthesizing conditions is sufficiently great, the addition of the modifying component may be made during the latter stages of the process of synthesizing the polyester. Thus, the time at which the addition is made should rather be decided from standpoint of the convenience in managing the process.

The proportion in which the polyester modifying component hereinbefore indicated is used is preferably 0.5–8 mol percent more preferably 1.0–5.0 mol percent per each mol of the basic constituent unit of the polyester (upon completion of the synthesis). When less than this amount is used, the affinity for basic dyes of the modified polyester produced is not adequate from the standpoint of practical utility. On the other hand, when the amount exceeds the foregoing limits, undesirable aspects appear in the desirable properties possessed by the base polyester such as, for example, that its chemical resistance suffers and that an excessively high melt viscosity is demonstrated in its production even in the case of a polyester of relatively low degree of polymerization.

As regard the apparatus, catalysts, additives and polymerization conditions to be used in the present invention, those used in producing the conventional synthetic polyesters can be conveniently employed.

The invention process which comprises using the aforesaid selected phenolsulfonates as the modifying component and adding these directly to the polyester polymerization system has a number of definite advantages when compared with the prior art which comprises adding an ester-forming modifying component to the polyester polymerization system. According to the present invention, sodium m-phenolsulfonate, for example, can be directly added to the polyester polymerization system without the necessity of first converting it into its ester-forming derivative, e.g. sodium m - (β - hydroxyethoxy)benzene sulfonate. It should be self evident that a simplification of the process is an economic advantage. Moreover, the purification of sodium m-phenolsulfonate is far more readily accomplished than that of sodium m - (β - hydroxyethoxy)benzene sulfonate. It is an indispensable demand for obtaining polyesters of fiber grade that the starting materials are purified to a high degree of purity. Again, the modified polyesters obtained in accordance with the present invention possess resistance to oxidation. For example, when a differential thermal analysis of polyethylene terephthalate modified using sodium resorcinol - 5 - sulfonate is carried out, a conspicuously desirable phenomenon is observed in that the exothermic peak seen in the case of the conventional polyethylene terephthalate in an atmosphere in which oxygen is present and believed to be due to oxidative degradation [Naiki and Kato, Kogyo Kagaku Zasshi, 69, 1816 (1966)] is either greatly reduced or completely disappears. While it is not yet clear as to the cause of this phenomenon, it is surprising when it is compared with the fact that this exothermic peak is not reduced in the case, for example, of the polyethylene terephthalate modified in accordance with the prior art using sodium 3,5-di(carbomethoxy) benzene sulfonate. Further, the chemical resistance of polyethylene terephthalate fiber modified in accordance with the present invention using sodium m-phenolsulfonate, for example, its decrease in tenacity under the conditions of immersion in boiling 5% aqueous sulfuric acid for 2 hours, is 31%, a value which is fully adequate to withstand practical use, whereas the decrease in tenacity under identical conditions in the case of polyethylene terephthalate modified with sodium 3,5-di(carboxymethoxy)benzene sulfonate is 57%.

The following examples are given for illustrating the invention more specifically. Unless otherwise indicated, the parts and percentages are on a weight basis.

EXAMPLE 1

(a) A 500-ml. 3-necked flask equipped with a distilling column was charged with 153 grams of dimethyl terephthalate, 120 grams of ethylene glycol, 3.3 grams of sodium m-phenolsulfonate, 0.02 gram of calcium acetate, 0.08 gram of lead oxide and 0.06 gram of antimony trioxide, after which the mixture was heated for 4 hours at 200° C. with stirring by means of a motor-operated stirrer to distill off the methanol formed. Next, after transferring the reaction mixture to a polymerization vessel, the polymerization reaction was carried out for 4 hours at 280° C. under reduced pressure of 0.5 mm. Hg to obtain a colorless, transparent polymer. The intrinsic viscosity of this polymer as measured in o-chlorophenol at 25° C. was 0.466 (dl./g.), while the softening point measured with a penetrometer was 260° C. When this polymer was melt-spun at 285° C. and thereafter drawn 3.8×, a filament having a tenacity of 3.4 g./d. and an elongation of 21% was obtained. 0.1 gram of the so obtained oriented filament was dyed for 90 minutes at 110° C. using a high temperature dyeing machine with 20 ml. of an aqueous 0.005% solution of the basic dye Aizen Cathilon Violet 3BLH. It was confirmed that the dye absorbed in the filament was 88% by measurement of the dye concentration in the residual liquor using a spectrophotometer. Further, when 20 ml. of an aqueous 0.04% solution of the basic dye Nichilon Black MHF was used and dyeing of the filament was carried out for 90 minutes at 130° C., it was dyed to a deep shade of black.

Next, 20 grams of the herein-obtained sulfonate-containing polyester in its comminuted form were placed in a 300-ml. round-bottom flask, followed by adding 200-ml. of water in which had been dissolved 9 grams of sodium hydroxide and thereafter heating under reflux for about 10 hours. After ascertaining that the aqueous solution had become clear, the water was distilled off completely, after which about 100 ml. of methanol were added and thereafter filtration was carried out. After evaporation of the methanol from the methanol filtrate, hydrochloric acid was added and the pH was adjusted to 2. After distillation of the water and methanol from this hydrochloric acid-acidified liquid, a small quantity of acetone was added, after which the inorganic salts such as common salt which were precipitated were separated by filtration. The filtrate was heated under reduced pressure to distill the ethylene glycol, after which a large quantity of acetone was added and crystals were separated out. When these crystals were extracted using a methanol-benzene mixture, followed by evaporation of the methanol-benzene mixture, and thereafter the crystals were dried under conditions of 110–120° C. and 10 mm. Hg for 5 hours, colorless crystals were obtained. By measuring the IR and NMR spectra, it was confirmed that this was in agreement with the standard sodium m-(β-hydroxyethoxy)benzene sulfonate. Further, the elemental analysis values were: C, 39.67%; H, 3.9% (calculated values: C, 40.00%; H, 3.78%.

(b) When by way of comparison a polyester was synthesized as in (a) except that 3.3 grams of sodium p-phenolsulfonate were used instead of 3.3 grams of sodium m-phenolsulfonate, a milky white polymer having an intrinsic viscosity of 0.561 (dl./g.) and a softening point of 250° C. was obtained. When a filament was spun and drawn under the identical conditions as in (a) a filament having a tenacity of 3.4 g./d. and an elongation of 43% was obtained, which when dyed under identical conditions as above using Aizen Cathilon Violet 3BLH demonstrated a dye absorption of 46%, but when dyed under identical conditions as above using Nichilon Black MHF, a black shade could not be obtained. Further, when this polymer was subjected to hydrolysis as above using sodium hydroxide, 0.236 gram of sodium p-(β-hydroxyethoxy)benzene sulfonate and 0.034 gram of unreacted sodium p-phenol sulfonate were recovered. Another experiment showed that a portion corresponding to 37% of the originally added sodium p-phenol sulfonate had decomposed to phenol and sodium bisulfate.

EXAMPLE 2

One hundred grams of bis(β-hydrooxyethyl) terephthalate, 6 grams of diethylene glycol, 1.5 grams of sodium m-phenolsulfate, 0.02 gram of calcium acetate, 0.05 gram of lead oxide and 0.06 gram of antimony trioxide were charged to a polymerization vessel and reacted for 4 hours under the conditions of 280° C. and 10–0.5 mm. Hg to obtain a colorless, transparent polymer. The intrinsic viscosity of this polymer was 0.534 (dl./g.) and its softening point was 248° C. This polymer was spun and drawn under identical conditions as in Example 1 and a filament having a tenacity of 4.3 g./d. and an elongation of 22% was obtained. When this filament was dyed under identical conditions as in Example 1 using Aizen Cathilon Violet 3BLH, the dye absorption was 96%.

EXAMPLE 3

A polymer was synthesized as in Example 1 from 153 grams of didimethyl terephthalate, 120 grams of ethylene glycol, 3.3 grams of sodium m-phenolsulfonate, 0.02 gram of calcium acetate and 0.06 gram of antimony trioxide. The polymer obtained was colorless and transparent and its intrinsic viscosity was 0.48 (dl./g.) and softening point was 259° C. This polymer was spun into a filament as in Example 1 and likewise to obtain an oriented filament having a tenacity of 3.5 g./d. and an elongation of 28%. When 0.1 gram of this oriented filament was dyed for 90 minutes at 120° C. in 20 ml. of an aqueous 0.005% solution of Aizen Cathilon Violet 3BLH, the dye absorption was 96%. Further, this filament was dyed to a deep shade of black by using 20 ml. of an aqueous 0.3% solution of Nichilon Black MHF under the conditions of 130° C. and 90 minutes.

EXAMPLE 4

When a polyester was synthesized as in Example 1, using 153 grams of dimethyl terephthalate, 120 grams of ethylene glycol, 3.7 grams of sodium 2-chlorophenol-4-sulfonate, 0.10 gram of calcium acetate and 0.06 gram of antimony trioxide, a polymer having a slightly milky white tinge, an intrinsic viscosity of 0.57 (dl./g.) and a softening point of 260° C. was obtained, which when spun and drawn yielded an oriented filament having a tenacity of 4.2 g./d. and an elongation of 22%. When 0.1 gram of this filament was dyed for 90 minutes at 120° C. using a pressured type high temperature dyeing machine with 20 ml. of an aqueous 0.005% solution of Aizen Cathilon Violet 3BLH, the dye absorption was 92%.

EXAMPLE 5

A polymer was synthesized as in Example 1, using 153 grams of dimethyl terephthalate, 120 grams of ethylene glycol, 8.4 grams of diethylene glycol, 5.5 grams of sodium 2-chlorophenol-4-sulfonate, 0.1 gram of calcium acetate, 0.08 gram of lead acetate and 0.06 gram of antimony trioxide, after which the polymer was spun and drawn in similar manner. The resulting oriented filament had an intrinsic viscosity of 0.48 (dl./g.), a softening point of 246° C., a tenacity of 3.3 g./d. and an elongation of 26%. It was dyed under identical conditions as in Example 1 using Aizen Cathilon Violet 3BLH, with the result that the dye absorption was 96%. Further, when it was dyed with Nichilon Black MHF, it was observed that it was dyed to a deep shade of black.

EXAMPLE 6

A colorless, transparent polymer was obtained as in Example 1 from 138 grams of dimethyl terephthalate, 14 grams of dimethyl adipate, 120 grams of ethylene glycol, 4 grams of potassium 2-naphthol-8-sulfonate, 0.08 gram of lead oxide and 0.06 gram of antimony trioxide. When, as in Example 1, this polymer was spun into filaments, then drawn and thereafter dyed under the condiitons of Example 1 using Aizen Cathilon Violet 3BLH, the dye absorption was 97%.

EXAMPLE 7

A colorless, transparent polymer having an intrinsic viscosity of 0.50 (dl./g.) and a softening point of 259° C. was obtained as in Example 1, using 153 grams of dimethyl terephthalate, 120 grams of ethylene glycol, 3.9 grams of sodium 2-naphthol-8-sulfonate, 0.04 gram of calcium acetate and 0.06 gram of antimony trioxide. This polymer was spun and drawn as in Example 1, and an oriented filament having a tenacity of 3.8 g./d. and an elongation of 28% was obtained. When 0.1 gram of this filament was dyed with 20 ml. of an aqueous 0.005% solution of Aizen Cathilon Violet 3BLH under the conditions of 120° C. and 90 minutes, the dye absorption was 96%. Further, when this filament was dyed with 20 ml. of an aqueous 0.04% solution of Nichilon Black MHF under the conditions of 130° C. and 90 minutes, it was observed that the filament was dyed to a deep shade of black.

EXAMPLE 8

A colorless, transparent polymer having an intrinsic viscosity of 0.566 (dl/g.) and a softening point of 244° C. was obtained as in Example 1, using 153 grams of dimethyl terephthalate, 120 grams of ethylene glycol, 8.4 grams of diethylene glycol, 3.9 grams of sodium 2-naphthol-8-sulfonate, 0.02 gram of calcium acetate and 0.06 gram of antimony trioxide. This was followed by spinning and drawing as in Example 1 to obtain a filament having a tenacity of 4.3 g./d. and an elongation of 25%. When this filament was dyed under identical conditions as in Example 7 with Aizen Cathilon Violet 3BLH, the dye absorption was 97%.

EXAMPLE 9

A polymer was synthesized as in Example 2, using 100 grams of bis(β-hydroxyethyl) terephthalate, 2.6 grams of sodium 2-naphthol-8-sulfonate, 0.02 gram of calcium acetate and 0.09 gram antimony trioxide. This polymer was then spun and drawn as in said examples to obtain an oriented filament having an intrinsic viscosity of 0.49 (dl./g.), a softening point of 258° C., a tenacity of 3.6 g./d. and an elongation of 27%. When this filament was dyed with Aizen Cathilon Violet 3BLH under identical conditions as in Example 7, the dye absorption was 94%. Further, it was observed that it was dyed to a deep shade of black with Nichilon Black MHF.

EXAMPLE 10

153 grams of dimethyl terephthalate, 120 grams of ethylene glycol, 0.15 gram of calcium acetate and 0.06 gram of antimony trioxide were used which, as in Example 1, were heated for 4 hours at 200° C. to distill off the methanol formed, after which the reaction mixture was transferred to a polymerization vessel where, after adding further 3.66 grams of potassium resorcinol-5-sulfonate, the reaction was carried out for 3.5 hours at 280° C. in such a manner that the pressure would finally become a reduced pressure of 0.6 mm. Hg. The resulting polymer had an intrinsic viscosity of 0.575 (dl./g.) and a softening point of 256° C. When the filament obtained by spinning and drawing as in Example 1 was dyed with Aizen Cathilon Violet 3BLH under identical conditions as in said example, the dye absorption was 95%.

EXAMPLE 11

A colorless, transparent polymer having an intrinsic viscosity of 0.635 (dl./g.) and a softening point of 257° C. was obtained as in Example 1, from 153 grams of dimethyl terephthalate, 120 grams of ethylene glycol 3.41 grams of sodium resorcinol-5-sulfonate, 0.16 gram of calcium acetate and 0.06 gram of antimony trioxide. When the filament obtained by spinning and drawing as in Example 1 was dyed with Aizen Cathilon Violet 3BLH under identical conditions as in said examples, the dye absorption was 95%; and when Nichilon Black MHF was used, a deep shade of black was obtained.

When the differential thermal analysis of a powder of the here obtained polymer was conducted in air using a differential thermal analysis apparatus (manufactured by Shimadzu Seisakusho, Ltd., Japan), an exothermic peak conceivably due to oxidative degradation was not observed to take place before the endothermic peak due to the melting of the crystalline zone of the polymer.

By way of comparison, a polymer was synthesized in like manner except that instead of 3.41 grams of sodium resorcinol-5-sulfonate 4.77 grams of sodium 3,5-di(carboxymethoxy)benzene sulfonate were used (in both cases the amount corresponds to 2 mol percent per each mol of the basic constituent unit of the polyester). A differential thermal analysis of this polymer was conducted under identical conditions. In this case, an exothermic peak conceivably due to oxidative degradation was observed prior to the melting of the crystalline zone, as in the case with the unmodified polyethylene terephthalate.

EXAMPLE 12

153 grams of dimethyl terephthalate, 120 grams of ethylene glycol, 3.16 grams of sodium m-phenolsulfonate, 0.15 gram of calcium acetate and 0.06 gram of antimony trioxide were used, and the polymerization reaction and spinning and drawing operations were carried out as in Example 1 to obtain a 12-filament oriented yarn whose monofilament fineness was 2.04 denier and having an intrinsic viscosity of 0.518, a softening point of 260° C., a tenacity of 3.77 g./d. and an elongation of 26%. Two grams of this oriented yarn were treated for 60 minutes at 98° C. with 160 ml. of aqueous 2% sodium hydroxide solution. When the weight decrease after the treatment was measured, it was 4.2% and the decrease in tenacity was 5.6%.

By way of comparison, a polymer synthesized under similar conditions using however 4.77 grams of sodium 3,5-di(carbomethoxy)benzene sulfonate instead of 3.16 grams of the sodium m-phenolsulfonate indicated above (both cases being 2 mol percent) had an intrinsic viscosity of 0.532 and a softening point of 256° C. The 12-filament yarn obtained from this polymer by spinning it and drawing the freshly spun filaments had a tenacity of 3.82 g./d., an elongation of 27% and its monofilament fineness was 2.06. When this yarn was treated similarly with aqueous 2% sodium hydroxide solution, the weight decrease was 7.3% and decrease in tenacity was 10.3%.

We claim:

1. A process of producing modified polyesters containing a minor proportion of an organic group having a sulfonate substituent in the form of an alkali metal salt thereon comprising adding at least one phenolsulfonate selected from the class consisting of the alkali metal salts of m-phenolsulfonic acid, 2-chlorophenol-4-sulfonic acid, 2-naphthol-8-sulfonic acid and resorcinol-5-sulfonic acid and the lithium salts of p-phenolsulfonic acid and hydroquinosulfonic acid, to the reaction mixture of a polyester which has an aliphatic alcoholic end group present during its synthesis, prior to the completion of said synthesis, said phenolsulfonate being added in an amount of 0.5 to 8 mol percent based on the acid component present in the reaction mixture and thereafter completing the synthesis of said polyester.

2. In producing modified polyesters containing a minor proportion of an organic group having a sulfonate substituent in the form of an alkali metal salt, the method which comprises adding at least one phenolsulfonate selected from the class consisting of the sodium and potassium salts of m-phenol-sulfonic acid, 2-naphthol-8-sulfonic acid and resorcinol-5-sulfonic acid, to the reaction mixture of a polyester which has an aliphatic alcoholic end group present during its synthesis prior to the completion of said synthesis, said phenolsulfonate being added in an amount of 1 to 5 mol percent based on the acid component present in said mixture and thereafter completing the synthesis of the polyester.

References Cited

UNITED STATES PATENTS

| | | | |
|---|---|---|---|
| 3,018,272 | 1/1962 | Griffing et al. | 260—75 |
| 3,310,532 | 3/1967 | Kazama et al. | 260—75 |
| 3,446,651 | 5/1969 | Clachan et al. | 117—73 |

WILLIAM H. SHORT, Primary Examiner

L. L. LEE, Assistant Examiner

U.S. Cl. X.R.

260—75, 78.3